Oct. 2, 1956

J. S. COLOMBINI 2,764,845

PLANT RECEPTACLE OF KNOCK-DOWN CONSTRUCTION

Filed Dec. 9, 1953

INVENTOR.
John S. Colombini.
BY
ATTORNEY.

Oct. 2, 1956  J. S. COLOMBINI  2,764,845
PLANT RECEPTACLE OF KNOCK-DOWN CONSTRUCTION
Filed Dec. 9, 1953  2 Sheets-Sheet 2

INVENTOR.
John S. Colombini
BY
ATTORNEY.

United States Patent Office 2,764,845
Patented Oct. 2, 1956

2,764,845

PLANT RECEPTACLE OF KNOCK-DOWN CONSTRUCTION

John S. Colombini, Detroit, Mich.

Application December 9, 1953, Serial No. 397,116

1 Claim. (Cl. 47—34)

This invention relates to a planter or flower box construction and has particular reference to such a device which is of knockdown construction so as to facilitate manufacture and assembly of the device and to permit handling and shipping of the knockdown unit at a reduced cost.

The improved planter consists of pairs of similarly formed and interchangeable wall sections of knockdown construction adapted to be assembled to form a receptacle or box adapted to receive plants or the like, and a supporting structure therefor also of knockdown construction so that the unit may be sold in its knocked-down condition and easily assembled by the purchaser.

A principal object of the invention is to provide a new and improved device of the class described.

A further object of the invention is to provide a flower box or the like of knockdown construction.

Another object of the invention is to provide a device of the class described which is simple in construction, inexpensive to manufacture, and which may be shipped in knockdown form and assembled by the purchaser of the device.

Other and further objects of the invention will be apparent from the following description and claim and may be understood by reference to the accompanying drawings, of which there are two sheets, which by way of illustration show a preferred embodiment of the invention and what I now consider to be the best mode in which I have contemplated applying the principles of my invention. Other embodiments of the invention may be used without departing from the scope of the present invention as set forth in the appended claim.

Figure 1:
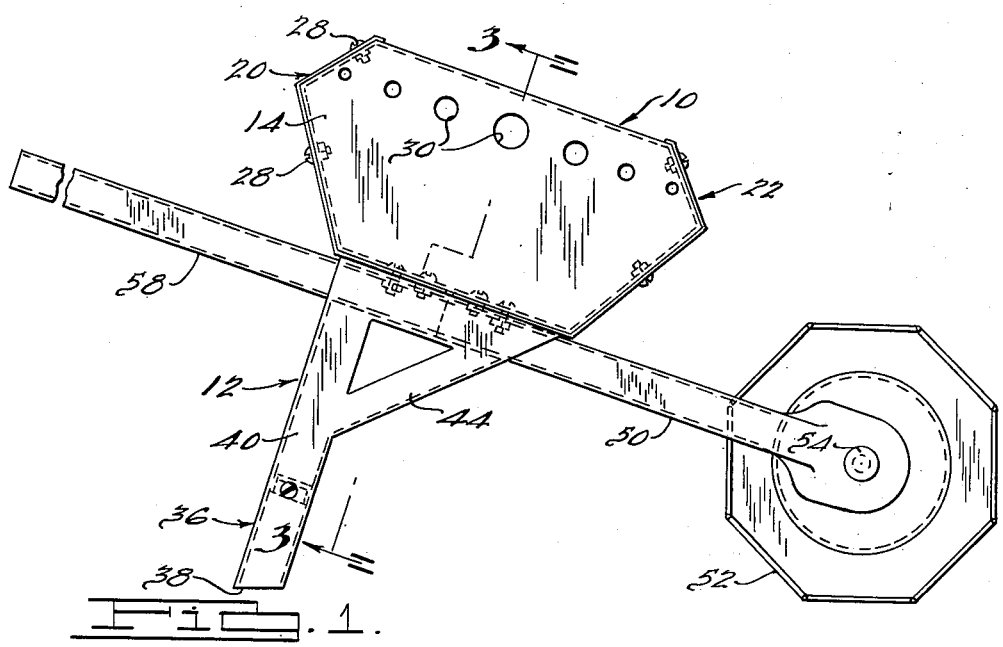
Fig. 1 is a side elevational view of the improved planter.

Referring more particularly to the drawings it will be seen that the planter comprises a receptacle structure 10 and a supporting means 12 therefor adapted to form a three-point support for the receptacle 10. The receptacle comprises a pair of similarly formed interchangeable end wall members 14 and 16 of suitable configuration and having laterally bent peripheral flanges 18 provided with suitable apertures by means of which the end wall members 14 and 16 are secured to wall sections 20 and 22 to define an open top receptacle. The wall sections 20 and 22 may also be similarly formed and interchangeable, and each comprises a side wall portion 24 and a bottom wall portion 26. The end walls 14 and 16 are adapted to be telescoped within the lateral edges of the side and bottom wall sections 20 and 22 as shown and secured thereto by means of suitable screws 28 projecting through the apertures in the lateral flanges 18 of the end walls and suitable apertures provided at the lateral edges of the wall sections 20 and 22. Obviously, the wall sections 20 and 22 could be telescoped into the flanges 18 on the end wall sections 14 and 16 if desired. The end walls may be provided with a row of apertures 30, and the walls 20 and 22 may be provided with rows of apertures 32 if desired for decorative purposes and to permit drainage from the receptacle.

By making the end walls 14 and 16 of identical shape and interchangeable, and by similarly forming the side and bottom wall sections 20 and 22, assembly of the receptacle is facilitated. The opposing edges of the wall sections 20 and 22 forming the bottom wall 26 of the receptacle may be spaced apart slightly as shown to permit drainage from the receptacle, and additional holes 34 may be provided in the bottom wall for this purpose if desired.

The supporting structure 12 comprises a pair of angularly shaped supporting brackets 36 each having a beveled lower edge 38 adapted to rest on the surface on which the planter is supported and a substantially upright leg portion 40 terminating at its upper end in a transverse attaching flange 42 in the form of an inverted L-shaped flange. A web or rib 44 connects the upright leg portion 40 with the forward end of the attaching flange 42.

The leg portions 40 of the brackets 36 may be channel shaped as shown, and at their upper ends are provided with cutouts 46, and the webs 44 are provided with similar cutouts so as to form a transverse channel between the attaching flange 42 and the flanges 48 provided on the brackets 36.

An angle shaped supporting arm 50 is telescoped into nesting relation with the inverted L-shaped attaching flange 42 of each bracket 36 and projects forwardly therefrom in the manner shown. The brackets 36 are arranged so that the attaching flanges thereof are disposed in converging, downwardly sloping relation, and the supporting arms 50 converge in the manner shown toward their forward ends. A member 52, which may be in the form of a wheel or of any other configuration, is secured between the forward ends of the converging supporting arms 50 by means of a bolt 54 and a nut 56.

A handle member 58 is telescoped into nesting relation with the attaching flange of each bracket 36 and is disposed in end to end relation with one of the supporting arms 50. The handle members 58 project rearwardly from the brackets 36 in diverging relation and the entire device thus simulates the appearance of a wheelbarrow or the like.

Figure 2:
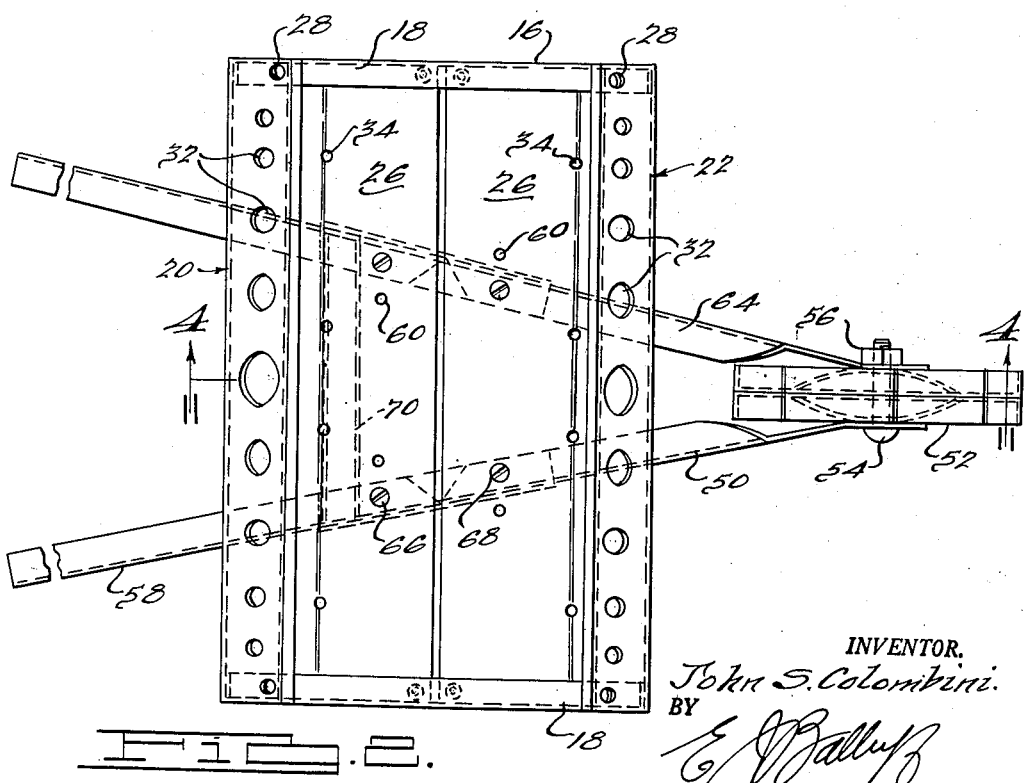
Fig. 2 is a top plan view of the device.
Figure 3:
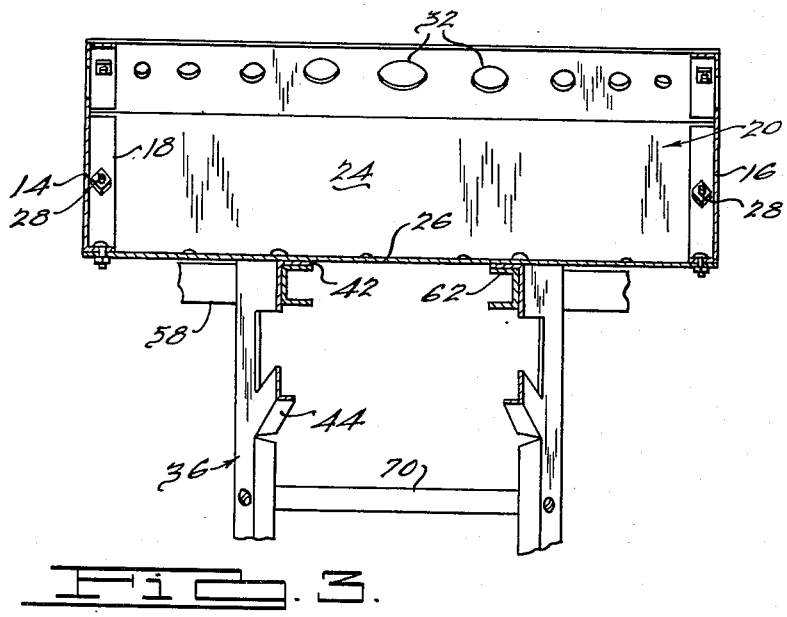
Fig. 3 is a sectional view taken on line 3—3 of Fig. 1.
Figure 4:
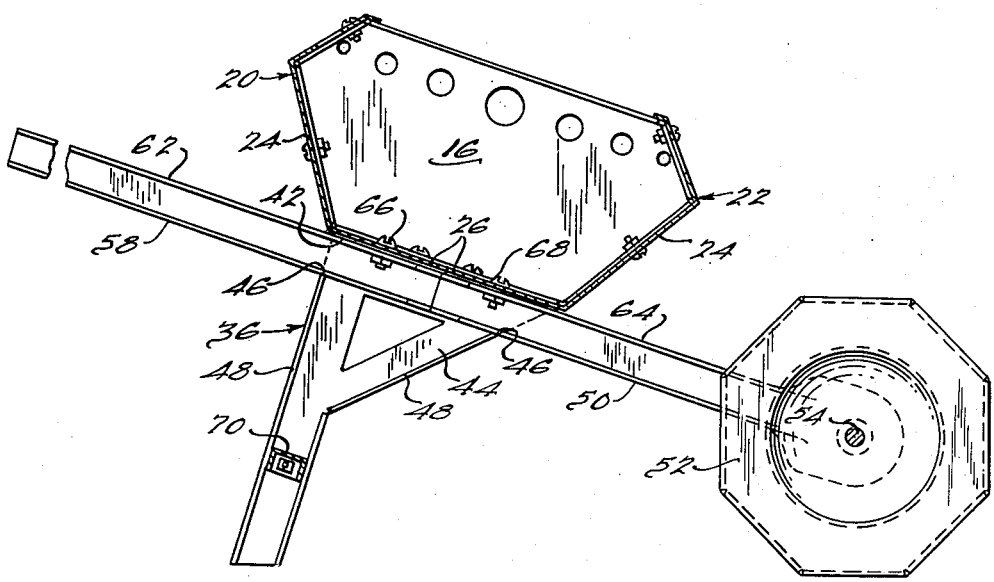
Fig. 4 is a vertical sectional view taken on line 4—4 of Fig. 2.

The bottom wall portion of each of the wall sections 20 and 22 is provided with two pairs of aligned apertures 60, as is best shown in Fig. 2. The handle members 58 are each provided with an aperture in the upper wall 62 thereof at the forward end of the handle member, and the supporting arms 50 are provided with similar apertures in the wall 64 which is in engagement with the under side of the attaching flange 42 of a bracket 36, and the attaching flanges 42 are each provided with a pair of apertures adapted to align with the apertures in the handle members 58 and the supporting arms 50.

Screws 66 extend through the two outermost apertures 60 in the bottom wall portion of the wall section 20 and through the aligned apertures formed in the attaching flanges 42 of the brackets 36 and the apertures provided at the forward ends of the handle members 58. Screws 68 project through the two innermost apertures 60 of the other wall section and through the aligned apertures in the flanges 42 and the support arms 50. Thus a single fastening means secures the receptacle to the brackets 36, and such fastening means also secures the handle member 58 and support arm 50 to the bracket 36. The provision of the two pairs of spaced apertures 60 in each bottom wall section 26 insures that the handles and supporting arms will be assembled to the receptacle in the proper relation as shown and makes it impossible to assemble the structure in an incorrect manner.

A transverse brace 70 extends between the leg portions 40 and the brackets 36 and is secured to the brackets by suitable fastening means, such as screws and nuts as show.

A planter constructed in accordance with this invention will be seen to be relatively inexpensive to manufacture because of the duplication or interchangeability of the various parts thereof as described and provides a knockdown construction to facilitate handling and shipping of the device at reduced transportation costs. Assembly by the purchaser of the device is rendered relatively simple because of the interchangeability of the parts thereof and because of the simple manner in which the various parts of the structure are assembled together.

While I have illustrated and described a preferred embodiment of my invention, it is understood that this is capable of modification, and I therefore do not wish to be limited to the precise details set forth but desire to avail myself of such changes and alterations as fall within the purview of the following claim.

I claim:

A device of the class described comprising a pair of similarly formed and interchangeable end walls and a pair of similarly formed and interchangeable side walls secured to said end walls to complete an open top receptacle of knockdown construction adapted to hold plants or the like, each side wall providing either the front or back wall and a part of the bottom wall of said receptacle, a pair of spaced supporting brackets each having a substantially upright leg portion and a transverse attaching flange at its upper end, support arms engaging said attaching flanges and projecting forwardly therefrom in converging relation, a supporting surface engaging member secured to the forward ends of said support arms, handle members engaging said flanges in end to end relation with said support arms and projecting rearwardly therefrom in diverging relation, said flanges, support arms and the bottom wall part of said front wall having aligned apertures, and said flanges, handle members and the bottom wall part of said back wall having aligned apertures, and screws extending through said apertures to secure said receptacle, said handle members, and said support arms to said supporting brackets.

References Cited in the file of this patent

UNITED STATES PATENTS

| | | |
|---|---|---|
| 1,242,418 | Booth | Oct. 9, 1917 |
| 1,405,568 | Conklin | Feb. 7, 1922 |
| 1,630,975 | Smith | May 31, 1927 |
| 2,553,334 | Schmidt | May 15, 1951 |